United States Patent
Rietzler et al.

(10) Patent No.: US 12,220,817 B2
(45) Date of Patent: Feb. 11, 2025

(54) AUTOMATION SYSTEM AND METHOD FOR HANDLING PRODUCTS

(71) Applicant: ROBOMINDS GMBH, Munich (DE)

(72) Inventors: Tobias Rietzler, Munich (DE); Manfred Rietzler, Bangkok (TH); Andreas Däubler, Munich (DE)

(73) Assignee: ROBOMINDS GMBH, Munich (DE)

( * ) Notice: Subject to any disclaimer, the term of this patent is extended or adjusted under 35 U.S.C. 154(b) by 425 days.

(21) Appl. No.: 17/633,657

(22) PCT Filed: May 14, 2020

(86) PCT No.: PCT/EP2020/063415
§ 371 (c)(1),
(2) Date: Feb. 8, 2022

(87) PCT Pub. No.: WO2021/028084
PCT Pub. Date: Feb. 18, 2021

(65) Prior Publication Data
US 2022/0314433 A1    Oct. 6, 2022

(30) Foreign Application Priority Data
Aug. 14, 2019 (DE) .............. 10 2019 121 889.6

(51) Int. Cl.
| | | |
|---|---|---|
| *B25J 9/16* | (2006.01) | |
| *G06N 20/00* | (2019.01) | |
| *G06T 7/60* | (2017.01) | |

(52) U.S. Cl.
CPC ............. *B25J 9/163* (2013.01); *B25J 9/1697* (2013.01); *G06N 20/00* (2019.01); *G06T 7/60* (2013.01); *G06T 2207/20081* (2013.01)

(58) Field of Classification Search
CPC ......... B25J 9/163; B25J 9/1697; G06N 20/00; G06T 7/60; G06T 2207/20081
See application file for complete search history.

(56) References Cited

U.S. PATENT DOCUMENTS

| 9,862,091 B2 | 1/2018 | Watanabe |
| 2017/0190052 A1 * | 7/2017 | Jaekel .................... B25J 9/1671 |

(Continued)

FOREIGN PATENT DOCUMENTS

| CN | 202412277 U * | 9/2012 |
| DE | 102009030461 A1 | 1/2010 |

(Continued)

*Primary Examiner* — Behrang Badii
*Assistant Examiner* — Jay Khandpur
(74) *Attorney, Agent, or Firm* — Dickinson Wright PLLC; Andrew D. Dorisio

(57) ABSTRACT

The invention relates to a method for handling products (17) using an automation system and to an automation system (10), the products being captured by means of an imaging sensor (18) of a control device (12) of the automation system and being handled by means of a handling mechanism (13) of a handling device (11) of the automation system, the control device processing sensor image data from the imaging sensor and controlling the handling device as specified by training data sets contained in a data memory (21) of the control device, the training data sets comprising training image data and/or geometric data and control instructions associated therewith, the training data sets being generated, as a statistical model, exclusively from geometric data contained in the training image data of products, by means of a computer using a computer program product executed thereon, the training data sets being transmitted to the control device.

19 Claims, 1 Drawing Sheet

(56) References Cited

U.S. PATENT DOCUMENTS

| | | | | |
|---|---|---|---|---|
| 2019/0077014 A1* | 3/2019 | Radrich | ................... | B25J 9/163 |
| 2019/0291277 A1* | 9/2019 | Oleynik | ................. | B25J 9/1669 |
| 2019/0337152 A1* | 11/2019 | Homberg | ............... | B25J 9/1697 |
| 2020/0019864 A1* | 1/2020 | Gu | ..................... | G05B 19/4183 |
| 2020/0050973 A1* | 2/2020 | Stenneth | ............ | G01C 21/3815 |
| 2020/0311616 A1* | 10/2020 | Rajkumar | .............. | G06N 3/008 |

FOREIGN PATENT DOCUMENTS

| | | |
|---|---|---|
| DE | 102014005758 A1 | 10/2014 |
| DE | 102014016072 A1 | 7/2015 |
| DE | 102016009030 A1 | 2/2017 |
| DE | 202017106506 U1 | 4/2018 |
| DE | 102018001781 A1 | 9/2018 |
| DE | 102018215826 A1 | 3/2019 |
| JP | 2017030135 A | 2/2017 |
| JP | 2018202550 A | 12/2018 |
| KR | 20190094312 A | 8/2019 |
| WO | 2019032723 A1 | 2/2019 |

\* cited by examiner

AUTOMATION SYSTEM AND METHOD FOR HANDLING PRODUCTS

TECHNICAL FIELD

The invention relates to a method for handling products using an automation system and to an automation system, the products being captured by means of an imaging sensor of a control device of the automation system and being handled by means of a handling mechanism of a handling device of the automation system, the control device processing the sensor image data from the imaging sensor and controlling the handling device as specified by training data sets contained in a data memory of the control device.

BACKGROUND

Methods and automation systems of this kind are sufficiently known and commonly used for handling products. In this context, the handling device can be any type of machine which is suitable for handling products, such as a robot or a gripping or conveying device of a machine tool. Here, it is essential that the products can be a variety of products and/or the same type of products in a variety of starting positions for starting handling. The respective product is captured by the imaging sensor, for example a camera or the like, and sensor image data of the imaging sensor are processed by a control device of the automation system. The control device now controls the relevant robot in such a way that, for example, different products (as the case may be in different positions) are automatically gripped and sorted or placed down in another spot in a predetermined order by the robot. Here, the control device comprises a data memory comprising training data sets which contain a plurality of possible products and their starting positions including the control instructions associated therewith for controlling the robot. In this way, it is possible that the robot can automatically grip a product, irrespective of its location or starting position, at suitable gripping points and can handle it as specified.

The training data sets can, for example, comprise image data and control instructions associated therewith which were previously taught to the robot. This can be effected in that the robot is manually moved to the product and this movement is stored as a control instruction in the data memory. Moreover, it is known to use so-called artificial intelligence for this type of handling tasks. Here, a computer generates a statistical model for a handling task. Various control instructions are for example provided for a series of possible products and their positions, rules for applying the right control instruction for this case being statistically determined by means of a computer by a real execution or simulation of the control instructions. The training data sets can be gathered by means of a simulation with a computer independently of a handling device or a robot. Depending on the type of products which are supposed to be handled and the way of handling said products, creating corresponding training data sets requires an individually high modification and thus programming effort, however. For instance, it is necessary to take a weight of a product and dynamics of a movement into account for simulating a gripping task if the gripping task is supposed to be fulfilled in the most secure way. This has the disadvantage that an individual modification and thus programming effort is very high. At the same time, large data amounts have to be processed, which further increases a technical effort and expenditure of time for generating training data sets.

Hence, the object of the invention is to propose a method for handling products using an automation system and an automation system which allows for a simplified application of artificial intelligence for handling tasks.

SUMMARY

In the inventive method for handling products using an automation system, the products are captured by means of an imaging sensor of a control device of the automation system and are handled by means of a handling mechanism of a handling device of the automation system, the control device processing the sensor image data from the imaging sensor and controlling the handling device as specified by training data sets contained in a data memory of the control device, the training data sets comprising training image data and/or geometric data and control instructions associated therewith, the training data sets being generated, as a statistical model, exclusively from geometric data contained in the training image data of products, by means of a computer using a computer program product executed thereon, the training data sets being transmitted to the control device.

The handling mechanism used for the method in accordance with the invention can be any type of mechanism which is suitable for manipulating products in the form of objects as part of an industrial process. Here, handling a product can for example comprise machining the product, too. Moreover, the imaging sensor can be any type of sensor which makes it possible to capture an image of the product or of its geometric shape. It is in particular envisaged that the control device processes real sensor image data from the imaging sensor by means of image processing, the handling device being controlled by the control device as a function of the real sensor image data and as specified by the training data sets. The training data sets contain training image data and control instructions associated therewith or, alternatively or additionally, geometric data of the respective products and the control instructions associated therewith. The control device assigns the sensor image data to the training image data or vice versa and handles the product captured by the imaging sensor according to the control instruction associated therewith. The training data sets are gathered independently of the handling device using a computer and a computer program product executed thereon or a software. Here, the training data sets are generated by means of the software exclusively from geometric data, which are gathered from the training image data by means of image processing. In particular, a statistical model is generated for the respective geometric data of a product along with the control instruction associated therewith, said geometric data being determined by the product itself and its position. The suitable control instruction is identified by a simulated application of a variety of control instructions solely on the basis of the geometric data, without taking into account other physical parameters. Due to this, it is made much easier to create training data sets for a variety of applications since a simplified programming and faster calculation of the training data sets becomes possible by not taking into account other parameters. The automation system can thus also be adapted to a variety of handling tasks more easily and can be used more universally.

The training data sets can be generated in a first step of the method, said training data sets being transmitted to the control device in a second step of the method. Hence, it can be envisaged to generate the training data sets using the computer in a location separate from the control device or the handling device. The local or spatial separation of the computer and the control device then also does not necessarily require a connection for data transmission, even though it is possible that there is a connection via the Internet for example. The training data sets completed in the first step can thus also be transmitted to the control device via a data connection, the control device then using the training data sets for controlling.

When handling the product, present mechanical variables, in particular forces, torques and/or friction, can be ignored when applying the statistical model. Taking into account forces and torques when simulating movements of a handling mechanism requires a particularly high computing power of the computer and is time-consuming. As it has been shown, these mechanical variables do not have to be taken into account and a sufficiently large number of usable training data sets can still be obtained as a result.

Alternatively, when handling the product, present mechanical variables, in particular forces, torques and/or friction, can be determined by means of at least one other sensor of the control device and can be taken into account when applying the statistical model. Force sensors, torque sensors, current sensors, tactile sensors and/or pressure sensors can be used as other determining sensors. In this way, a particularly large number of very precise training data sets can be obtained by simulation and can be adapted to the actual conditions during the handling task. Furthermore, it is possible to indicate a quality standard for a control instruction in the training image data by means of the other sensor. In this way, a quality of the real training image data can be enhanced.

Real image data and/or artificially created representative image data of products can be used as training image data. By using real image data, the accuracy of the training data sets can be enhanced because a real situation is actually illustrated. Artificially created representative image data of products can, however, be obtained and larger numbers of them can be produced with considerably less effort.

The statistical model can be generated without a specified tolerance of the training image data. Training image data and/or geometric data can be processed using the statistical model for calculating the training data sets together with other variables and the control instructions without a deliberately specified tolerance. An effort in compiling the training data sets has been shown to be further reducible by doing without a specified tolerance of the data used for the calculation, without a quality of the training data sets being deteriorated. Likewise, it is possible to envisage a specified tolerance or a deliberate uncertainty of the data used for the calculation.

The statistical model can be generated using an empirical or analytical method. The empirical method is a generalization, for example of a product and its position and of a movement of the handling mechanism according to a control instruction so that the handling mechanism does not perform the best movement for the case at hand.

The statistical model can be generated by means of an approximation method, in particular deep learning, convolutional neural networks (CNNs), recursive nets (RNNs), stochastic machines, random forests or support-vector machines. These approximation methods relate to different optimization methods of artificial neural networks which have a number of intermediate layers between an input layer and an output layer and whose inner structure can be formed as part of a training using the training image data and the control instructions.

The statistical model can be generated by supervised learning and/or reinforcement learning. The computer program product or the software of the computer can then generate the inputs for the statistical model or the training image data and/or the control instructions associated therewith and can recognize their categories and connections. With supervised learning, a clustering method can be employed.

The control device is configured to capture a motion sequence of the handling mechanism handling a product, the imaging sensor being configured to capture a handling sequence of the product, the control device being configured to process the sensor image data of the imaging sensor and change the training data sets contained in the data memory of the control device as a function of the sequence and the motion sequence, the statistical model of the training data sets being able to be changed. Hence, it can be envisaged that the training data sets are further optimized when the control device is using the training data sets or in real operation of the handling device. This optimization can be effected in that the sensor image data from the imaging sensor are processed by the control device by means of image processing and are correlated with the executed control instruction of the control device. Instead of a control instruction, the control device can also use other sensors of the handling mechanism, such as range sensors, force sensors and/or acceleration sensors, for optimizing the statistical model. It is essential that the training data sets compiled using the computer in off-line operation of the handling device can now be optimized further in online operation of the handling device by adapting the statistical model.

The control device is configured to determine a quality of the product handling and to take said quality into account when changing the statistical model of the training data sets. The quality of the product handling can for example be detected via the sensor image data from the imaging sensor if a product cannot be handled or if sensor data of other sensors of the handling mechanism do not correspond to the control instructions of the handling mechanism. If, for example, an error occurs when handling a product, the sensor image data and control instructions responsible for the error can be integrated into the changes in the statistical model.

A camera, a stereoscopic camera, a structured light camera, a light field camera or a lidar system can be used as the imaging sensor. Depending on the type of product to be handled, a two-dimensional image of the product may be sufficient. It is advantageous to use multiple cameras so that a three-dimensional image or model of the relevant product can be obtained with the aid of the imaging sensor. In order to ensure consistently high quality of sensor image data, sensors can be used which are for example independent of a lighting situation. Apart from the above-mentioned sensors, depending on the application, mechanical sensors for scanning a product or also ultrasonic sensors can also be used as imaging sensors.

Consequently, training image data and/or sensor image data describing a two-dimensional and/or three-dimensional shape of the respective product can advantageously be used.

The handling device is configured to grip, join, test, apply or machine the product. A handling of the product is therefore understood to include all manipulations or activities executed for the product apart from conveying it.

Gripping points at the respective product can be detected from the training image data and/or sensor image data. It is reasonable to detect gripping points only if the handling mechanism is supposed to grip products. Gripping can be effected using the grippers which are commonly known and which are suitable for the respective product, such as mechanical parallel grippers, vacuum grippers, magnetic grippers, adhesive grippers or the like. By detecting gripping points or preselecting them, the handling of products can be considerably improved.

It is advantageous if the gripping points are determined by means of image processing. The gripping points can for example be detected by comparing image features, so-called feature matching algorithms. Moreover, by means of image processing, a scene analysis can be conducted including a localization of products and gripping points, an object recognition and/or a location recognition. For detecting gripping points, a scene analysis is not necessarily required.

The handling mechanism which is used can at least be movable in two or three spatial axes and can preferably be a multi-axle robot. The multi-axle robot can have a plurality of hinges, wherein it is possible to integrate range sensors, force sensors and/or acceleration sensors in the respective hinges. These other sensors can for example be force sensors, torque sensors, current sensors, tactile sensors and/or pressure sensors and can be used for the evaluation of a real handling sequence of a product by the control device.

The automation system according to the invention, which is in particular a robot or the like, comprises a handling device having a handling mechanism for handling the products and a control device for controlling the handling device, the control device having a data memory comprising training data sets and at least one imaging sensor for capturing the products, the control device being configured to process sensor image data from the imaging sensor and to control the handling device as specified by the training data sets, the training data sets comprising training image data and/or geometric data and control instructions associated therewith, the training data sets being configured to be generated, as a statistical model, exclusively from geometric data contained in the training image data of products, by means of a computer using a computer program product executable thereon, the training data sets being configured to be transmitted to the control device.

Regarding the advantages of the automation system in accordance with the invention, reference is made to the description of the advantages of the method in accordance with the invention. Other advantageous embodiments of an automation system are apparent from the description.

BRIEF DESCRIPTION OF THE DRAWINGS

In the following, a preferred embodiment of the invention is described in more detail with reference to the attached drawings.

In the figures.

DETAILED DESCRIPTION

Figure 1:
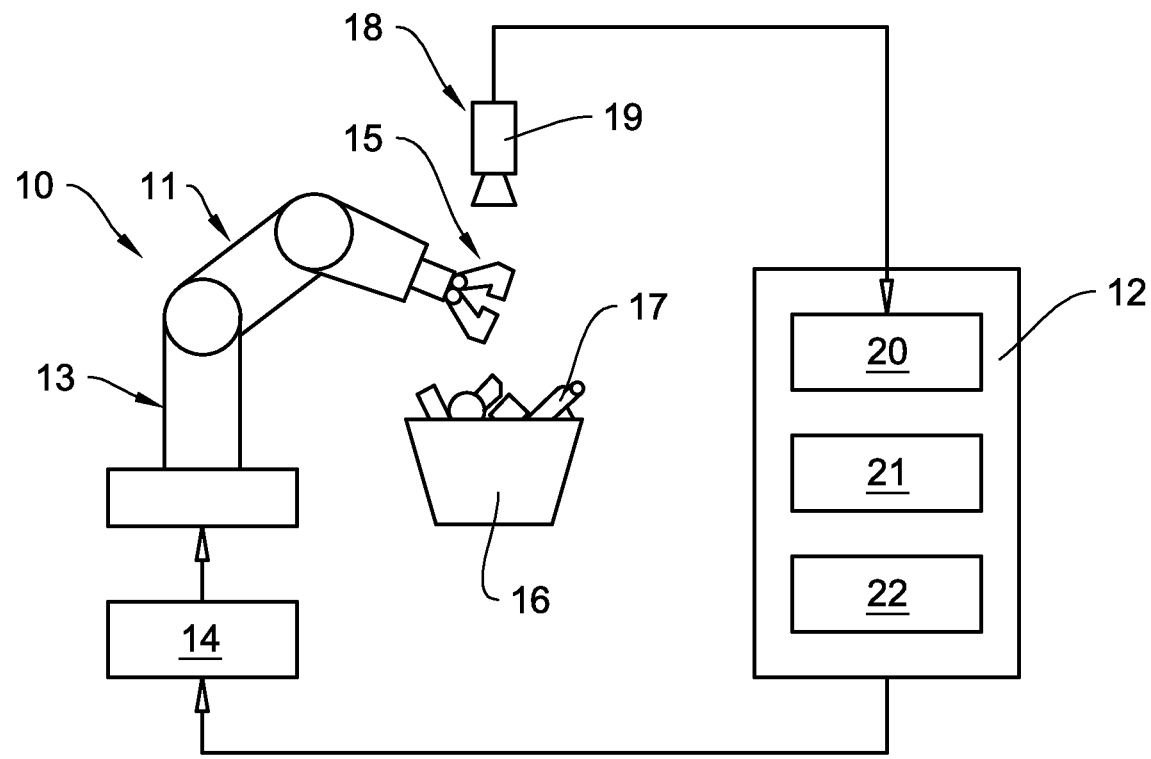
FIG. 1 shows a schematic illustration of an automation system.

FIG. 1 shows an automation system 10 which is illustrated in a simplified fashion and which is formed by a handling device 11 and a control device 12. The handling device 11 comprises a multi-axle robot 13 having a drive control 14 and a gripper 15 which is realized for gripping different products 17 which are located in a container 16. The products 17 each have a different shape, are placed in an unstructured fashion and can be gripped by means of the gripper 15 and can be handled or sorted by the robot 13.

The control device 12 comprises an imaging sensor 18 which is realized by a camera 19 here, and means for image processing 20, a data memory 21 containing training data sets and a control unit 22. By means of the camera 19, images of the products 17 can then be captured and transmitted to the means for image processing 20 as sensor image data. As part of an image processing, a localization or object recognition of the products 17 and a gripping point recognition are then effected. Depending on the type and position of the gripping points, the control instructions associated therewith are selected from the training data sets and are transmitted to the drive control 14 by the control unit 22, said drive control 14 initiating a movement of the robot 13 or the gripper 15 for gripping and handling the relevant product 17.

Figure 2:
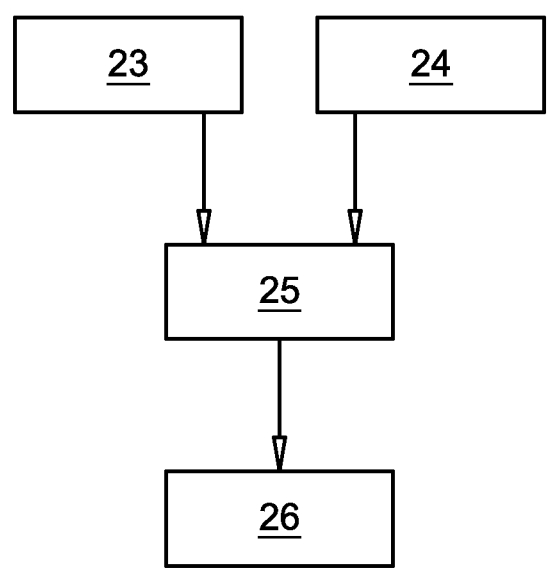
FIG. 2 shows a diagrammatic illustration of a creation of training data sets.

FIG. 2 shows a schematic illustration of a method for generating training data sets independently of the control device illustrated in FIG. 1. First, training image data 23 and control instructions 24 are provided, wherein it is possible to use both real training image data and control instructions and training image data and control instructions artificially created by a computer. The training image data 23 and control instructions 24 are processed by means of a statistical model 25 which is executed on a computer (not illustrated here) as a computer program product or software. With the statistical model 25, an approximation method, for example deep learning, is used, with the aid of which training data sets 26 are generated. The training data sets 26 comprise the training image data 23 and/or geometric data including the control instructions 24 associated therewith, which have been assigned to the training image data 23 by the statistical model 25. The training data sets 26 generated in this way 26 can then be transmitted to the robot corresponding to the illustration FIG. 1 for being used.

The invention claimed is:

1. A method for handling products (17) using an automation system (11), the products being captured by means of an imaging sensor (18) of a control device (12) of the automation system and being handled by means of a handling mechanism (13) of a handling device (11) of the automation system, comprising processing by way of the control device (12) sensor image data produced by the imaging sensor and controlling the handling device as specified by training data sets (26) contained in a data memory (21) of the control device, wherein the training data sets comprise training image data (23) or geometric data and control instructions (24) associated therewith, the training data sets being generated, as a statistical model (25), exclusively from geometric data contained in the training image data of products, by means of a computer using a computer program product executed thereon, the training data sets being transmitted to the control device; and manipulating the product or executing an action on the product based at least partially on the training data sets.

2. The method according to claim 1, wherein the training data sets (26) are generated in a first step and in that the training data sets are transmitted to the control device (12) in a second step.

3. The method according to claim 1, wherein when handling the product (17), present mechanical variables, in particular forces, torques or friction, are not taken into account when applying the statistical model (25).

4. The method according to claim 1, wherein when handling the product (17), present mechanical variables, in particular forces, torques or friction, are determined by means of at least one other sensor (18) of the control device (12) and are taken into account when applying the statistical model (25).

5. The method according to claim 1, wherein real image data or artificially created representative image data of products (17) are used as training image data (23).

6. The method according to claim 1, wherein the statistical model (25) is generated without a specified tolerance of the training image data (23).

7. The method according to claim 1, wherein the statistical model (25) is generated using an empirical or analytical method.

8. The method according to claim 1, wherein the statistical model (25) is generated by means of an approximation method, in particular deep learning, convolutional neural networks (CNNs), recursive nets (RNNs), stochastic machines, random forests or support-vector machines.

9. The method according to claim 1, wherein the statistical model (25) is generated by supervised learning or reinforcement learning.

10. The method according to claim 1, wherein the control device (12) captures a motion sequence of the handling mechanism (13) handling a product (17), the imaging sensor (18) capturing a handling sequence of the product, the control device processing the sensor image data of the imaging sensor and changing the training data sets (26) contained in the data memory (21) of the control device as a function of the sequence and the motion sequence, the statistical model of the training data sets being changed.

11. The method according to claim 10, wherein the control device (12) determines a quality of the handling of the product and takes said quality into account when changing the statistical model (25) of the training data sets (26).

12. The method according to claim 1, wherein a camera (19), a stereoscopic camera, a structured light camera, a light field camera or a lidar system is used as the imaging sensor (18).

13. The method according to claim 1, wherein training image data (23) or sensor image data describing a two-dimensional or three-dimensional shape of the respective product (17) are used.

14. The method according to claim 1, wherein the handling device (12) grips, joins, tests, applies or machines the product (17).

15. The method according to claim 1, wherein gripping points at the respective product (17) are detected from the training image data (23) or sensor image data.

16. The method according to claim 15, wherein the gripping points are determined by means of image processing.

17. The method according to claim 1, wherein the handling mechanism which is used is at least movable in two or three spatial axes and is preferably a multi-axle robot (13).

18. An automation system (11) for handling products (17), comprising: a handling device (11) having a handling mechanism (13) for handling the products and a control device (12) for controlling the handling device, the control device having a data memory (21) comprising training data sets (26) and at least one imaging sensor (18) for capturing the products, the control device being configured to process sensor image data from the imaging sensor and to control the handling device as specified by the training data sets (26), wherein the training data sets comprise training image data (23) or geometric data and control instructions (24) associated therewith, the training data sets being configured to be generated, as a statistical model (25), exclusively from geometric data contained in the training image data of products, by means of a computer using a computer program product executable thereon, the training data sets being configured to be transmitted to the control device.

19. A method for handling products using an automation system, the products being captured by an imaging sensor of a controller of the automation system and being handled by a robot, comprising:

processing by way of the controller sensor image data produced by the imaging sensor and controlling the robot to manipulate the product or to execute an action on the product as specified by training data sets contained in a data memory associated with the controller, wherein the training data sets comprise training image data or geometric data and control instructions associated therewith, the training data sets being generated, as a statistical model, exclusively from geometric data contained in the training image data of products, by a computer using a computer program product executed thereon, the training data sets being transmitted to the controller.

* * * * *